US006535217B1

(12) United States Patent
Chih et al.

(10) Patent No.: US 6,535,217 B1
(45) Date of Patent: Mar. 18, 2003

(54) INTEGRATED CIRCUIT FOR GRAPHICS PROCESSING INCLUDING CONFIGURABLE DISPLAY INTERFACE AND METHOD THEREFORE

(75) Inventors: David Chih, Scarborough (CA); Erwin Pang, Richmond Hill (CA)

(73) Assignee: ATI International Srl, Barbados (BB)

( * ) Notice: Subject to any disclaimer, the term of this patent is extended or adjusted under 35 U.S.C. 154(b) by 0 days.

(21) Appl. No.: 09/233,815

(22) Filed: Jan. 20, 1999

(51) Int. Cl.[7] .......................... G06F 13/14; G06F 15/00

(52) U.S. Cl. ....................... 345/519; 345/501; 345/559; 345/530; 710/69; 710/71; 710/106

(58) Field of Search ................................ 345/501–503, 345/519, 559, 89, 98, 530; 363/59, 62; 327/50, 58, 74, 77; 710/69, 71, 106, 129, 130, 305; 725/146–150

(56) References Cited

U.S. PATENT DOCUMENTS

| | | | | | |
|---|---|---|---|---|---|
| 5,495,186 | A | * | 2/1996 | Kanazawa et al. | 326/83 |
| 5,943,064 | A | * | 8/1999 | Hong | 345/502 |
| 5,948,091 | A | * | 9/1999 | Kerigan et al. | 710/129 |
| 5,974,464 | A | * | 10/1999 | Shin et al. | 709/231 |
| 6,041,010 | A | * | 3/2000 | Puar et al. | 365/226 |
| 6,049,316 | A | * | 4/2000 | Nolan et al. | 345/1 |
| 6,085,257 | A | * | 7/2000 | Ducaroir et al. | 710/1 |
| 6,104,414 | A | * | 8/2000 | Odryna et al. | 345/509 |
| 6,150,997 | A | * | 11/2000 | Asprey | 345/2 |
| 6,151,334 | A | * | 11/2000 | Kim et al. | 370/468 |
| 6,184,919 | B1 | * | 2/2001 | Asprey et al. | 348/6 |
| 6,216,185 | B1 | * | 4/2001 | Chu | 710/101 |
| 6,275,239 | B1 | * | 8/2001 | Ezer et al. | 345/473 |

OTHER PUBLICATIONS

U.S. patent application Publication No. US 2001/0011312 A1, Aug. 2, 2001, Inventor:William Chu.*

Vesa Plug and Play (P&D) Standard, Version 1, Revision 0, Jun. 11, 1997, pp. 1–109.*

* cited by examiner

*Primary Examiner*—Ulka J. Chauhan

(74) *Attorney, Agent, or Firm*—Vedder, Price, Kaufman, Kammholz

(57) ABSTRACT

An integrated circuit for graphics processing that includes a configurable display interface includes video graphics circuitry, a data encoder, transmission circuitry and configuration registers. The video graphics circuitry produces video data that is formatted to drive a display. The data encoder is operably coupled to the video graphics circuitry and encodes the digital video data to produce transmission data. The transmission data is then provided to the transmission circuitry operably coupled to the data encoder. The transmission circuitry combines the transmission data with control information that is retrieved from registers included in the integrated circuit. The transmission circuitry transmits the transmission data over a plurality of differential signals, where the swing amplitude of the differential signals is configured using additional registers included in the integrated circuit.

14 Claims, 2 Drawing Sheets

INTEGRATED CIRCUIT FOR GRAPHICS PROCESSING INCLUDING CONFIGURABLE DISPLAY INTERFACE AND METHOD THEREFORE

FIELD OF THE INVENTION

The invention relates generally to graphics processing and more particularly to an integrated circuit for graphics processing which includes a configurable display interface and a method therefore.

BACKGROUND OF THE INVENTION

Computers are used in many applications. As computing systems continue to evolve, the graphical display characteristics of computing systems become more and more advanced. In order to convey the required data to these advanced display systems, higher transmission data rates between the circuitry which generates the display data and the actual display are required.

In addition to providing a high rate of data transmission, the interface between the processing system which produces the display data and the actual display device must provide transmission capabilities that are reliable and also that do not interfere with other elements internal to and external to the computing system. This is especially true in the transmission of video data between a host processing system and flat-panel displays, which include liquid crystal displays (LCD's). The data rates required to adequately drive an LCD display are very high. When this data is transmitted in a digital fashion, the high-speed switching of the signal lines can result in electromagnetic interference (EMI) that can have detrimental effects on other portions of the system.

In order to meet these transmission needs, external circuits that receive digital information and convert it to analog differential voltage transmissions have been developed. These external circuits perform this conversion utilizing an encoding scheme that reduces signal transitions and power consumption, and also provides DC balancing on the transmission lines to ensure accurate recovery of the data on the receiving end. One such transmission standard, transition minimized differential signaling (TMDS) has been developed to suit the needs of many LCD displays.

Unfortunately such external transmission solutions require large data interfaces with host processors that produce the image data for display. These complex interfaces increase production cost and also contribute to EMI emissions in circuits which utilize a TMDS interface with a graphics processing integrated circuit, or chip. Additional problems with the interface between the graphics processing chip and the TMDS transmitting circuitry include cross talk, signal skew, and intertrace balancing. All of these limitations can place a ceiling on the maximum data rates that are achievable in a system. Thus, the operating frequency of such a combined circuit can be restricted by these inherent limitations.

Typical TMDS transmission circuits are mounted on printed circuit boards with a graphics circuit that provides the image data to be encoded and transmitted. On these printed circuit boards, control signals that are included in the TMDS transmission stream are typically configured using resistors that are mounted to the printed circuit board. In order to change the settings of the control signals included in the stream, these resistors have to be replaced.

Similarly, the swing amplitude of the differential signals utilized in a TMDS system is configured using external resistors mounted to the printed circuit board. Often, the swing amplitude of a TMDS transmitter may have to be adjusted to suit different cable lengths that connect the transmitting circuitry to the receiver in the display device.

In order to adjust for different cable lengths and transmission characteristics, these external resistors have to be replaced to alter the swing amplitude of the transmission signals. Thus, the requirement of adjusting actual physical circuit components in order to change the swing amplitude or the value of control signals broadcast with the transmitted data is both cumbersome and limiting in the effective use of current TMDS transmitters.

Therefore, a need exists for a data transmission system between the graphic circuitry which creates the signals to drive the display, and the actual display device. Such a transmission system should allow for flexible configuration of control signals included in the system and also flexible configuration of the drive strength of the transmitter. In addition to this, the transmission system should eliminate complex interchip digital interfaces, thus reducing EMI emissions and allowing data rates that are not achievable in prior art systems.

DETAILED DESCRIPTION OF THE PREFERRED EMBODIMENTS OF THE INVENTION

Generally, the present invention provides an integrated circuit for graphics processing that includes a configurable display interface of a method for its use. The integrated solution includes video graphics circuitry that produces video data that is formatted to drive a display. A data encoder in the system is operably coupled to the video graphics circuitry and encodes the digital video data to produce transmission data. The transmission data is then provided to transmission circuitry operably coupled to the data encoder. The transmission circuitry combines the transmission data with control information that is retrieved from registers within the integrated circuit. The transmission circuitry transmits the transmission data over a plurality of differential signals, where the swing amplitude of the differential signals is configured using additional registers included on the integrated circuit.

By integrating the transmission circuitry onto the integrated circuit that produces the digital video data for display, the complex interconnect between separate integrated circuits is avoided. This reduces limitations that existed in prior art solutions such as cross talk, signal skew, and intertrace balancing. By eliminating these limitations, the overall operating frequency of the transmission circuitry can be increased to allow for higher data rates. The programmable registers within the integrated circuit allow the control signals that are included in the transmission of the transmission data to be configured in a flexible manner to suit the needs of varying applications. Similarly, providing registers that control the swing amplitude of the differential transmission signals allows flexible configuration of the drive strength of the transmission circuitry, thus allowing for the use of the integrated circuit with a variety of transmission media.

Figure 1:
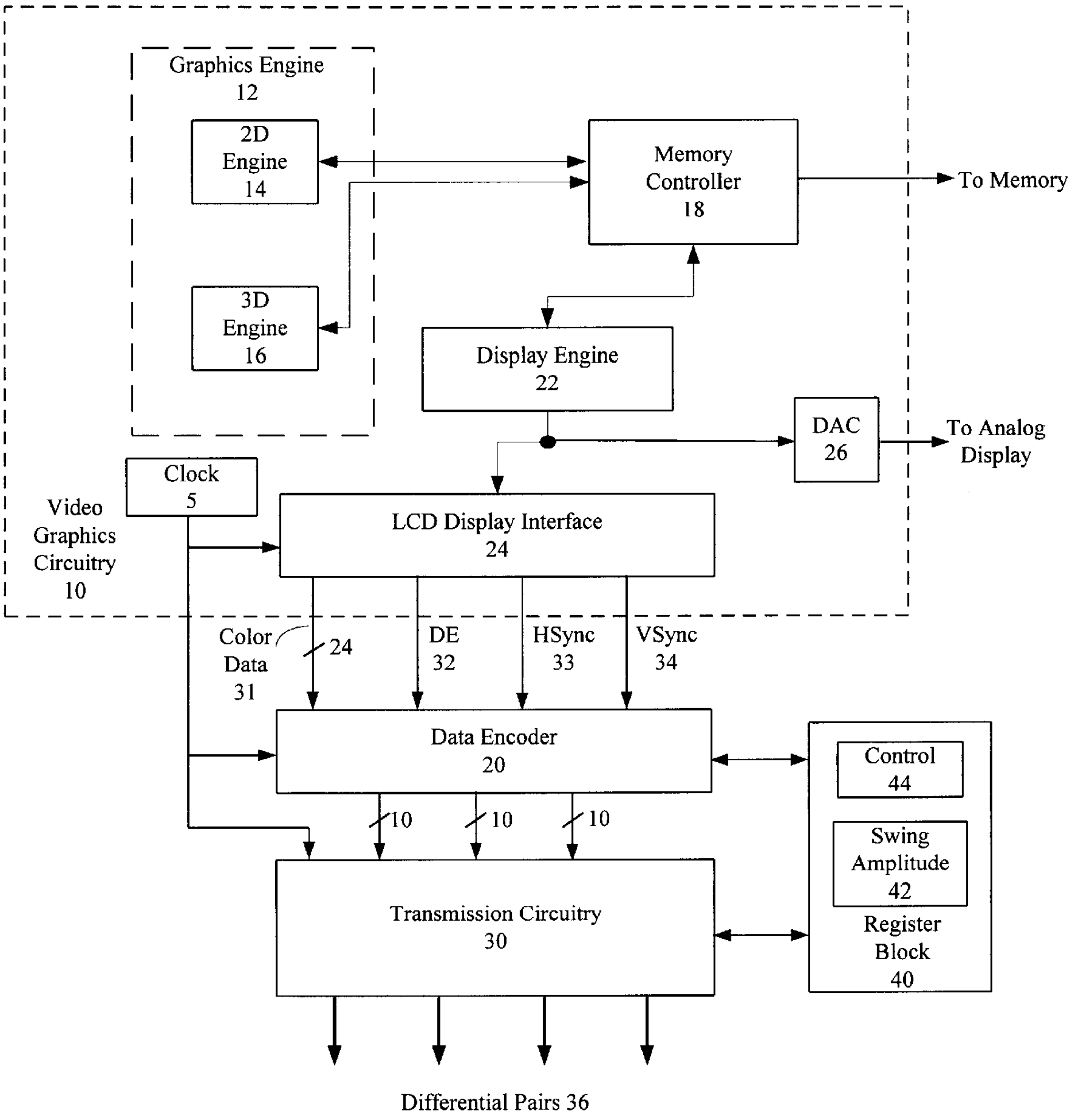
FIG. 1 illustrates a block diagram of an integrated circuit that includes graphics processing capabilities and a configurable display interface in accordance with the present invention.
Figure 2:
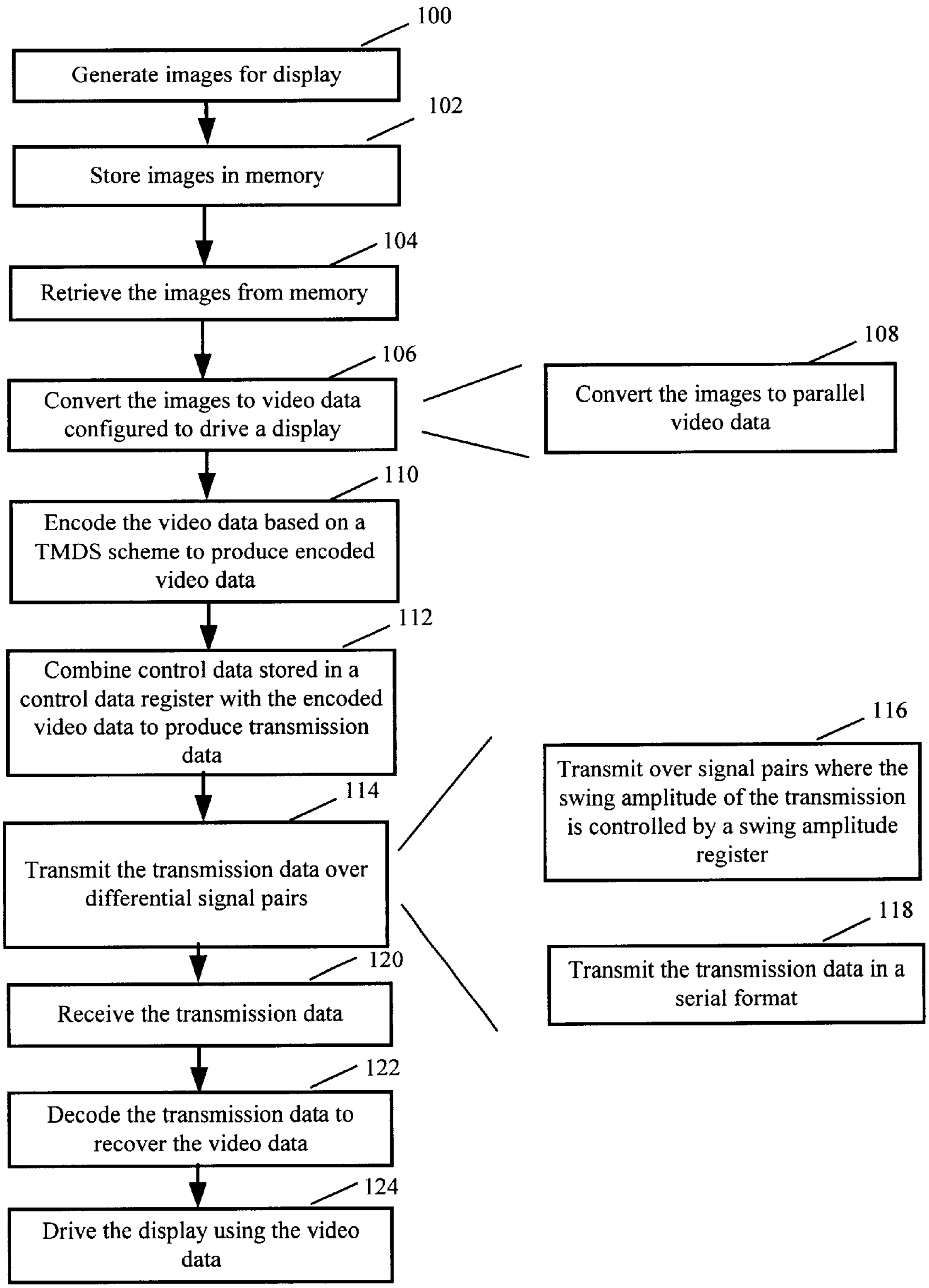
FIG. 2 illustrates a flow diagram of a method for transmitting video graphics display information in a integrated system in accordance with the present invention.

The invention can be better understood with reference to FIGS. 1 and 2. FIG. 1 illustrates a block diagram of an integrated circuit that includes video graphics circuitry 10, a data encoder 20, and transmission circuitry 30. The video graphics circuitry 10 produces digital video data that is formatted to drive a display. Preferably, the digital video data produced by the video graphics circuitry 10 is of a format that is directly compatible with the required format of a display device. More preferably, the signals produced by the video graphics circuitry 10 include a 24-bit color bus 31, a display enable signal 32, a horizontal synchronization signal 33, and a vertical synchronization signal 34. In order to provide these signals to the display, the signals must be routed via signals external to the integrated circuit. Because of the high rate of data transmission over these external signals, and the patterns that can be produced over these signals, directly transmitting these signals external to the integrated circuit to a display is impractical. This is because the transmission characteristics associated with this data in its raw format are problematic in terms of EMI emissions, potential DC wander on the transmission lines, and the number of transmission lines that would be required to transmit the signals in parallel.

The TMDS transmission system has been developed to allow transmission of these digital video data signals over a number of differential signal pairs. These differential signal pairs transmit the digital video data information in an encoded format, where the encoding reduces the transmission problems that would be associated with transmitting the data in an unencoded format. By using this encoding standard, the DC balance of the transmission lines is maintained, the number of transitions within the encoded data is minimized to reduce power consumption, the EMI emissions of the transmission lines are reduced using low swing differential voltage transmission, and the plurality of parallel data signals are serialized to produce a reduced number of differential signals for transmission. TMDS transmission schemes are known in the art, and are known to be applicable to interfacing LCD displays and other flat-panel displays that require digital video data signals. These displays demand both reliability and high data rate transmissions to produce the desired display output.

TMDS transmission systems can utilize terminated cables, twisted pair, or optical fiber to transmit the data for display. Prior art systems implemented TMDS transmitters as discrete integrated circuits that were coupled to a large digital interface that provided the video data for display from a video graphics integrated circuit. As can be seen from the FIG. 1, the coupling between the video graphics circuitry 10 and the data encoder 20 includes a number of signals. In contrast to the system of FIG. 1, prior art systems had to route these signal external to the two separate integrated circuits. As illustrated in FIG. 1, by including the TMDS transmission circuitry within the same integrated circuit as the video graphics circuitry, these external connections are eliminated. Eliminating these external connections can allow higher speed data transmission between the video graphics circuitry 10 and the data encoder 20, as off chip parasitics that result in speed limitations are not a factor.

Preferably, the video graphics circuitry 10 of the present invention includes a graphics engine 12 that produces images for display. More preferably, the graphics engine 12 includes a two-dimensional (2-D) graphics engine 14 and a three-dimensional (3-D) graphics engine 16. The 2-D graphics engine 14 processes two-dimensional graphics images to produce a two-dimensional portion of the images generated for display. Similarly, the 3-D graphics engine processes three-dimensional graphics images to produce a three-dimensional portion of the images generated for display.

The video graphics circuitry 10 also preferably includes a memory controller 18 that is operably coupled to the graphics engine 12, where the memory controller 18 stores the images generated for display in a memory structure. The memory structure is preferably external to the integrated circuit that includes the video graphics circuitry and the transmission circuitry, but it should be obvious to one of ordinary skill in the art that the memory structure could be included on the integrated circuit with the other circuit components. The external memory structure may be an external frame buffer or may be external system memory of a controlling processor coupled to the integrated circuit.

The video graphics circuitry 10 also preferably includes a display engine 22 that is operably coupled to the memory controller 18. The display engine 22 converts images retrieved via the memory controller 18 to the digital video data that is fed to the data encoder 20. The video graphics circuitry 10 may also include an LCD display interface 24 that receives the digital video data from the display engine 22 and configures the digital video data such that the digital video data is compatible with the input requirements of the data encoder 20. The format of the input requirements of the data encoder 20 preferably includes the 24-bit color data 31, the display enable signal 32, and horizontal and vertical synchronization signals 33 and 34.

The video graphics circuitry 10 may also include a digital to analog converter (DAC) 26 that is operably coupled to the display engine 22. The digital analog converter 26 receives the digital video data provided by the display engine 22 and converts the digital video data to an analog format that is suitable for driving an analog display. Providing both a analog display output from the integrated circuit as well as the TMDS format display signals allows the integrated circuit to be utilized in applications that include a digital display such as a LCD display and in applications that include an analog display such as a CRT display.

The data encoder 20 is operably coupled to the video graphics circuitry 10 such that it receives the digital video data for display. As stated earlier, the preferable format for the digital video data includes 24 bits of color data 31, where the 24 bits include 8 bits for each of three colors, where the three colors are preferably red, green and blue (RGB). Accompanying the color data is a display enable signal 32, and horizontal and vertical synchronization signals 33 and 34. When the display enable signal is in a first logic state that indicates active display time, each of the eight bit color data segments is converted to ten bit coded data. As stated earlier, the encoding insures that a transition minimized, DC balanced, serial transmission data stream will result. When the display enable signal 32 is in the logic state that indicates a blank time, or the time where the display is not actively being drawn to, the two synchronization signals 33 and 34, as well as four other control signals from the register block 44, are encoded into ten bit synchronization control characters. These special characters are transmitted to enable the receiver to synchronize during each blank interval. Preferably, there are a total of four different synchronization control characters. The four synchronization control characters are shared by all three of the color channels and are reused in each of the three data channels for synchronization purposes.

The selection from the four possible control characters is based on the values of the horizontal and vertical synchronization signals 33 and 34. These two signals are used to select which of the four control characters is being sent over one of the differential pair transmission lines during the blank time. The other two differential signal pairs that carry color data during active display times carry additional control signals that are based on a set of control data that are preferably stored in a control register 44. Preferably, the control data stored in the control register effectively replaces the external resistors that set these control data values in prior art circuits. In such cases, the control data includes four bits. Two bits of the four bits are utilized to generate one of the four potential control characters on each of the other two differential pairs. As stated earlier, in prior art systems, the four bits of control data that were typically hard-wired to specific values on the circuit board, such that there was no flexibility in the configuration of the control bits. By storing the four control data bits in a control register 44 within a register block 40, the control data bits can be configured as may be required in systems that utilize these control bits in TMDS transmission. Note that control register 44 that stores the control data may be intermingled with other circuitry within the integrated circuit rather than grouped with other registers in a register block 40.

Preferably, the data encoder 20 produces three parallel encoded data streams for transmission by the transmission circuitry 30, where each data stream corresponds to one of the colors utilized in generating the display. The transmission circuitry receives this parallel transmission data and transmits the data using differential signal pairs 36. The differential signal pairs 36 allow transmission of this data in a serialized fashion that has the benefits of low power consumption and low EMI emissions.

The differential signal pairs 36 utilized to transmit the data have configurable swing amplitudes based on a swing amplitude parameter. Preferably, the swing amplitude parameter is stored in a swing amplitude register 42 that may or may not be included in a register block 40. In systems that require greater swing amplitude, such as those that include very long transmission cables or lines, the swing amplitude can be increased by modifying the swing amplitude parameter stored in the swing amplitude register 42. This is a much more flexible option then was presented to users in prior art solutions, where the swing amplitude was configured based on hard-wired circuitry on the circuit board. Thus, a graphics card which utilizes the integrated circuit as described has the capability of increasing or decreasing the swing amplitude of the differential pairs 36 by writing to the swing amplitude register 42. This allows the graphics card to be utilized in a wider variety of systems having different transmission amplitude requirements.

Note that the transmission circuitry 30 includes four differential pairs 36. Three of the differential pairs 36 are utilized to transmit serialized encoded color data, which when the display is not enabled, may include control characters. Preferably, the transmission circuitry 30 converts the parallel data that it receives from the data encoder to serial data for transmission utilizing an internal phase lock loop (PLL). This serialized data is then transmitted over the interconnect layer, which is preferably a TMDS interconnect layer. The fourth differential pair is utilized for transmission of a clock signal. The TMDS interconnect layer consists of the three high-speed data channels for blue, red, and green colors, and one low-speed clock channel. Thus, the data transmission rates on three of the differential pairs 36 may be at a higher speed than the transmission speed on the fourth pair, which transmits the clock signal generated by the clock 5.

By incorporating the data encoder and transmission circuitry as illustrated in FIG. 1 in an integrated circuit that includes the graphics circuitry which renders and stores the graphics images for transmission and display, limitations that were detrimental to system performance in non-integrated prior art solutions are avoided. The advantages provided by the integration are further enhanced by the ability to alter the control data bits and the swing amplitude utilized in the data encoding and transmission by merely writing to registers included in the integrated circuit. This is a substantial advantage over prior art solutions that require hardware components to be reconfigured to change these parameters.

FIG. 2 illustrates a flow chart of a method for transmitting video graphics display information that is preferably performed by a single integrated circuit. At step 100, the images to be display are generated. Preferably, this image generation is performed on the integrated circuit using a graphics engine which may include both a 3-D graphics engine and a 2-D graphics engine as illustrated in FIG. 1. At step 102, the images are stored in a memory structure. The memory structure may be located on the integrated circuit with the other system components, are may be on off chip memory device that is coupled to the integrated circuit.

At step 104, the images are retrieved from the memory for display. At step 106, the retrieved images are converted to video data where the video data is formatted to drive a display. The conversion performed at step 106 preferably includes step 108 at which the images are converted to parallel video data, which may include a parallel data stream for each of the color components utilized to draw the images to a display.

At step 110, the video data is encoded based on a TMDS scheme to produce encoded video data. The encoding process at step 110 insures that the data that is transmitted will be transition minimized and DC balanced. The actual format of the TMDS data stream was described in more detail with respect to FIG. 1, and the TMDS formatting standard is known in the art.

At step 112, control data stored in a control register is combined with the encoded video data to produce transmission data. The control data stored in the control register is utilized to generate control characters that are to be transmitted over the transmission lines during blank times. This was described above with respect to FIG. 1. The register that stores the control data is preferably on the same integrated circuit as the circuitry that generates the graphics images and the circuitry that transmits the encoded data. By including these registers on the integrated circuit and allowing them to be configured in a flexible manner, a variety of control characters can be generated and transmitted, whereas in prior art systems, the control characters that were generated were fixed.

At step 114, the transmission data is transmitted over differential signal pairs. The transmission performed at step 114 preferably includes step 116, where the data is transmitted over signal pairs where the swing amplitude of the signal pairs is controlled using a swing amplitude register. The swing amplitude register is preferably included on the integrated circuit that includes the transmission circuitry. The swing amplitude register allows the amplitude of the transmission signal to be varied to accommodate the requirements of different transmission media that may be utilized in the display system. Thus, long cable lengths or other high impedance transmission lines can be adequately driven by configuring the swing amplitude using the swing amplitude register.

The data that is transmitted over the differential signal pairs is preferably transmitted according to step 118, which transmits the transmission data in a serial format. Thus, the encoded data is in a parallel format and is serialized by the transmission circuitry prior to transmission. This serialization reduces the number of connectors or signal paths required to transmit the data.

At step 120, the transmitted data is received by a receiver. The receiver is typically included in a display device that utilizes the transmission data to generate the onscreen images. At step 122, the transmission data is decoded at the receiver to recover the video data which was originally generated at step 106. This video data is in a format appropriate to drive the display device coupled to the receiver.

At step 124, the display is driven with the video data signal such that the images are displayed on the display. The original video data that was generated at step 106 is provided to the display via the transmission and receiving circuitry utilized by the method described. The video data is first encoded and then serialized before transmission. After transmission, the data is decoded and returned to the parallel format and provided for display.

By including the swing amplitude registers and the control data registers on the integrated circuit which includes the graphics image generation circuitry and the transmission circuitry, a number of advantage over prior art solutions are achieved. One important advantage is the overall operating frequency of the transmission circuitry can be increased as off-chip limitations such as cross talk, signal skew and intertrace balancing are avoided. Avoiding these limitations allows the circuitry located internal to the integrated circuit to run at a much higher rate thus allowing for a higher transmission rate. The on-chip swing amplitude registers allow for flexible configuration of the amplitude of the transmission signals to suit the needs of various transmission media. The inclusion of the on chip control data register also allows for addition flexibility over prior art solutions that hard-wired these control signals to logic high or logic low values. Additional advantages are realized in the reduced footprint area achieved through integrating more than one integrated circuit into a single integrated circuit. The integrated solution also requires fewer on board components such as resistors previously required to tie off certain signals. In addition to this, all of the traces on the printed circuit board that interconnected the previously separated transmission circuitry to the graphics generation circuitry are eliminated.

Thus, the solution presented herein allows for better performance in a system that reduces cost and printed circuit board complexity. It should be understood that the implementation of other variations and modifications of the invention and its various aspects will be apparent to those of ordinary skill in the art, and that the invention is not limited to the specific embodiments. It is therefore contemplated to cover by the present invention, any and all modifications, variations, or equivalence that fall within the spirit and scope of the basic underlying principles disclosed in claim herein.

What is claimed is:

1. An integrated circuit comprising:

video graphics circuitry, wherein the video graphics circuitry produces digital video data, wherein the digital video data is formatted to drive a display;

a data encoder operably coupled to the video graphics circuitry, wherein the data encoder encodes the digital video data to produce transmission data;

transition minimized differential signaling circuitry operably coupled to the data encoder, wherein the transition minimized differential signaling circuitry is configured to drive a transition minimized differential signaling interconnect layer to transmit the transmission data; and a swing amplitude register operably coupled to the transmission circuitry, wherein the swing amplitude register stores a swing amplitude parameter, wherein the transmission circuitry transmits the transmission data using differential signals having a swing amplitude based on the swing amplitude parameter.

2. The integrated circuit of claim 1 further comprises control registers operably coupled to data encoder, wherein the control registers store control data, wherein the data encoder includes the control data with the transmission data.

3. The integrated circuit of claim 2, wherein the video graphics circuitry further comprises:

a graphics engine, wherein the graphics engine produces images for display;

a memory controller operably coupled to the graphics engine, wherein the memory controller stores and retrieves the images utilizing a memory structure; and a display engine operably coupled to the memory controller and the data encoder, wherein the display engine converts the images to the digital video data.

4. The integrated circuit of claim 3, wherein the graphics engine further comprises:

a two-dimensional graphics engine operably coupled to the memory controller, wherein the two-dimensional graphics engine processes two-dimensional graphics images to produce a two-dimensional portion of the images for display; and a three-dimensional graphics engine operably coupled to the memory controller, wherein the three-dimensional graphics engine processes three-dimensional graphics images to produce a three-dimensional portion of the images for display.

5. The integrated circuit of claim 4, wherein the graphics engine further comprises a display interface operably coupled to the display engine, wherein the display interface configures the digital video data such that it is compatible with input requirements of the data encoder.

6. The integrated circuit of claim 5 further comprises a digital to analog converter operably coupled to the display engine, wherein the digital to analog converter converts the digital video data from the display engine to an analog format for driving an analog display.

7. A video graphics integrated circuit comprising:

a memory controller, wherein the memory controller is adapted to operably couple to a memory, wherein the memory controller stores and retrieves images for display using the memory;

a two-dimensional graphics engine operably coupled to the memory controller, wherein the two-dimensional graphics engine processes two-dimensional graphics images to produce a two-dimensional portion of the images for display;

a three-dimensional graphics engine operably coupled to the memory controller, wherein the three dimensional graphics engine processes three-dimensional graphics images to produce a three-dimensional portion of the images for display;

a display engine operably coupled to the memory controller, wherein the display engine converts the images to the digital video data;

a display interface operably coupled to the display engine, wherein the display interface converts the digital video data to a display compatible digital format, wherein the display compatible digital format includes a plurality of parallel data streams;

a data encoder operably coupled to the display interface, wherein the data encoder encodes each of the parallel data streams into an encoded data stream to produce a plurality of parallel encoded data streams;

transmission circuitry operably coupled to the data encoder, wherein the transmission circuitry serializes each of the plurality of parallel encoded data streams to produce a plurality of encoded serial data streams, wherein the plurality of encoded serial data streams are provided to a corresponding plurality of differential output pairs for transmission; and a swing amplitude register operably coupled to the transmission circuitry, wherein the swing amplitude register controls the swing amplitude of the differential output pairs of the transmission circuitry.

8. The video graphics integrated circuit of claim 7 further comprises control registers operably coupled to the data encoder, wherein the control registers store control data, wherein the data encoder includes the control data in a first portion of the plurality of encoded serial data streams.

9. The video graphics integrated circuit of claim 8, wherein the transmission circuitry is configured to receive display synchronization signals and display enable signals, wherein the transmitter includes the display synchronization signals and the display enable signals in a second portion of the plurality of encoded serial data streams.

10. The video graphics integrated circuit of claim 7, wherein the interface converts the digital video data to a display compatible digital format that includes a three parallel data streams, wherein each of the parallel data streams corresponds to a color, wherein the data encoder encodes each of the three parallel data streams to produce three parallel encoded data streams, wherein the transmission circuitry serializes each of the three parallel encoded data streams to produce three encoded serial data streams, wherein the three encoded serial data streams are provided to three differential output pairs for transmission, and wherein the transmission circuitry is further configured to drive a fourth differential output pair, wherein the fourth differential output pair transmits a clock signal.

11. A method for transmitting video graphics display information within an integrated circuit comprising:

retrieving images from a memory for display;

converting the images to video data, wherein the video data is configured to drive a display;

encoding the video data based on a transition minimized differential signaling scheme to produce encoded video data;

combining control data stored in a control register with the encoded video data to produce transmission data; and transmitting from the integrated circuit the transmission data over a plurality of differential signal pairs, wherein swing amplitude of the differential signal pairs is controlled by a swing amplitude register.

12. The method of claim 11, wherein the video data is parallel video data, and wherein transmitting further comprises transmitting the transmission data in a serial format.

13. The method of claim 12 further comprises:

receiving the transmission data;

decoding the transmission data to recover the video data; and driving the display with the video data such that the images are displayed on the display.

14. The method of claim 11 further comprises:

generating the images; and storing the images in the memory.

* * * * *